(12) United States Patent
Faulkingham

(10) Patent No.: US 8,327,963 B1
(45) Date of Patent: Dec. 11, 2012

(54) REMOTE CONTROLLED UTILITY VEHICLE

(76) Inventor: Michael R. Faulkingham, Wilmington, MA (US)

( * ) Notice: Subject to any disclaimer, the term of this patent is extended or adjusted under 35 U.S.C. 154(b) by 318 days.

(21) Appl. No.: 12/760,006

(22) Filed: Apr. 14, 2010

(51) Int. Cl.
*B62D 1/24* (2006.01)
(52) U.S. Cl. ......................................... 180/167; 180/9.1
(58) Field of Classification Search .................. 180/167, 180/9.1, 9.21, 9.22, 9.23; 280/656, 47.34, 280/47.35, 79.11, 79.2; 701/2
See application file for complete search history.

(56) References Cited

U.S. PATENT DOCUMENTS

| | | | |
|---|---|---|---|
| 4,729,444 A * | 3/1988 | Tubman | 180/9.22 |
| 4,747,457 A * | 5/1988 | Buscaiolo et al. | 180/19.1 |
| 5,969,501 A * | 10/1999 | Glidden et al. | 320/101 |
| 6,502,656 B2 * | 1/2003 | Weiss et al. | 180/168 |
| 6,708,995 B2 * | 3/2004 | Norris | 280/204 |
| 6,923,277 B2 * | 8/2005 | Lin | 180/2.2 |
| D514,391 S | 2/2006 | Miesieski et al. | |
| 7,384,051 B1 * | 6/2008 | Haire | 280/47.34 |
| 7,762,363 B1 * | 7/2010 | Hirschfeld | 180/65.1 |
| 7,798,886 B1 * | 9/2010 | Williamson | 446/456 |
| 2005/0029030 A1 | 2/2005 | Ewert | |
| 2008/0149406 A1 | 6/2008 | Williams | |
| 2010/0123294 A1 * | 5/2010 | Ellington et al. | 280/47.371 |
| 2011/0079972 A1 * | 4/2011 | Watson | 280/47.4 |

\* cited by examiner

*Primary Examiner* — John Walters

(57) ABSTRACT

The remote controlled utility vehicle provides a substantially all purpose vehicle for carrying a plethora of personal items and needs. The floor contains a plurality of closable storage compartments and also numerous tubular holders for items like umbrellas and fishing poles. The removable rails help contain any cargo, and the side rails provide flip up solar panels. Most beach and like outings see substantial sunshine. The solar panels can therefore power the apparatus without need of the charging port, which might be used elsewhere in preparation of apparatus uses. The separately controlled drive wheels are linked to rear free wheels and provide, together, treaded track power to negotiate even difficult and especially sandy terrain. Positioning the drive wheels in front features best propulsion and steering characteristics, with treaded tracks providing excellent traction. Flip down cup holders provide convenience, as does multidirectional lighting.

3 Claims, 4 Drawing Sheets

REMOTE CONTROLLED UTILITY VEHICLE

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Beachgoers and other outdoor enthusiasts often especially need to transport many items and even children, especially if multiple activities are to be enjoyed. The present apparatus provides a unique vehicle especially suited to serving outdoor enthusiasts.

FIELD OF THE INVENTION

The remote controlled utility vehicle relates to remote controlled vehicles and more especially to a vehicle that is especially useful in a beach setting or other outdoor locale.

SUMMARY OF THE INVENTION

The general purpose of the remote controlled utility vehicle, described subsequently in greater detail, is to provide a remote controlled utility vehicle which has many novel features that result in an improved remote controlled utility vehicle which is not anticipated, rendered obvious, suggested, or even implied by prior art, either alone or in combination thereof.

To attain this, the remote controlled utility vehicle provides a substantially all purpose vehicle for carrying a plethora of personal items and needs. The floor contains a plurality of closable storage compartments and also numerous tubular holders for items like umbrellas and fishing poles, for example. The removable rails help contain any cargo, including children, and the side rails also provide flip up solar panels. Most beach and like outings see substantial sunshine. The solar panels can therefore power the apparatus without need of the charging port, which might be used elsewhere in preparation of apparatus uses. The separately controlled drive wheels are linked to rear free wheels and provide, together, treaded track power to negotiate even difficult and especially sandy terrain. Positioning the drive wheels in front features best propulsion and steering characteristics, with treaded tracks providing excellent traction. Flip down cup holders provide convenience, as does front lighting which is both forward and partially to the sides.

The apparatus is not limited to remote control only but may further comprise manual drive controls. The apparatus also lends itself to be towed by a variety of other vehicles and people.

Thus has been broadly outlined the more important features of the improved remote controlled utility vehicle so that the detailed description thereof that follows may be better understood and in order that the present contribution to the art may be better appreciated.

An object of the remote controlled utility vehicle is to provide a compact utility cart.

Another object of the remote controlled utility vehicle is to provide for securely carrying a host of varied equipment needs.

A further object of the remote controlled utility vehicle is to provide dual motor and dual wheel drive.

An added object of the remote controlled utility vehicle is to provide a utility cart that is easily propelled on sand and other difficult surfaces.

And, an object of the remote controlled utility vehicle is to provide for solar power of the cart.

Another object of the remote controlled utility vehicle is to provide multiple direction headlights.

Still another object of the remote controlled utility vehicle is to provide front wheel drive with free wheeling, treaded track front wheel to rear wheel connections.

These together with additional objects, features and advantages of the improved remote controlled utility vehicle will be readily apparent to those of ordinary skill in the art upon reading the following detailed description of presently preferred, but nonetheless illustrative, embodiments of the improved remote controlled utility vehicle when taken in conjunction with the accompanying drawings.

In this respect, before explaining the current embodiments of the improved remote controlled utility vehicle in detail, it is to be understood that the remote controlled utility vehicle is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved remote controlled utility vehicle. It is therefore important that the claims be regarded as including such equivalent constructions insofar as they do not depart from the spirit and scope of the remote controlled utility vehicle. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 6 thereof, the principles and concepts of the remote controlled utility vehicle generally designated by the reference number 10 will be described.

Figure 1:
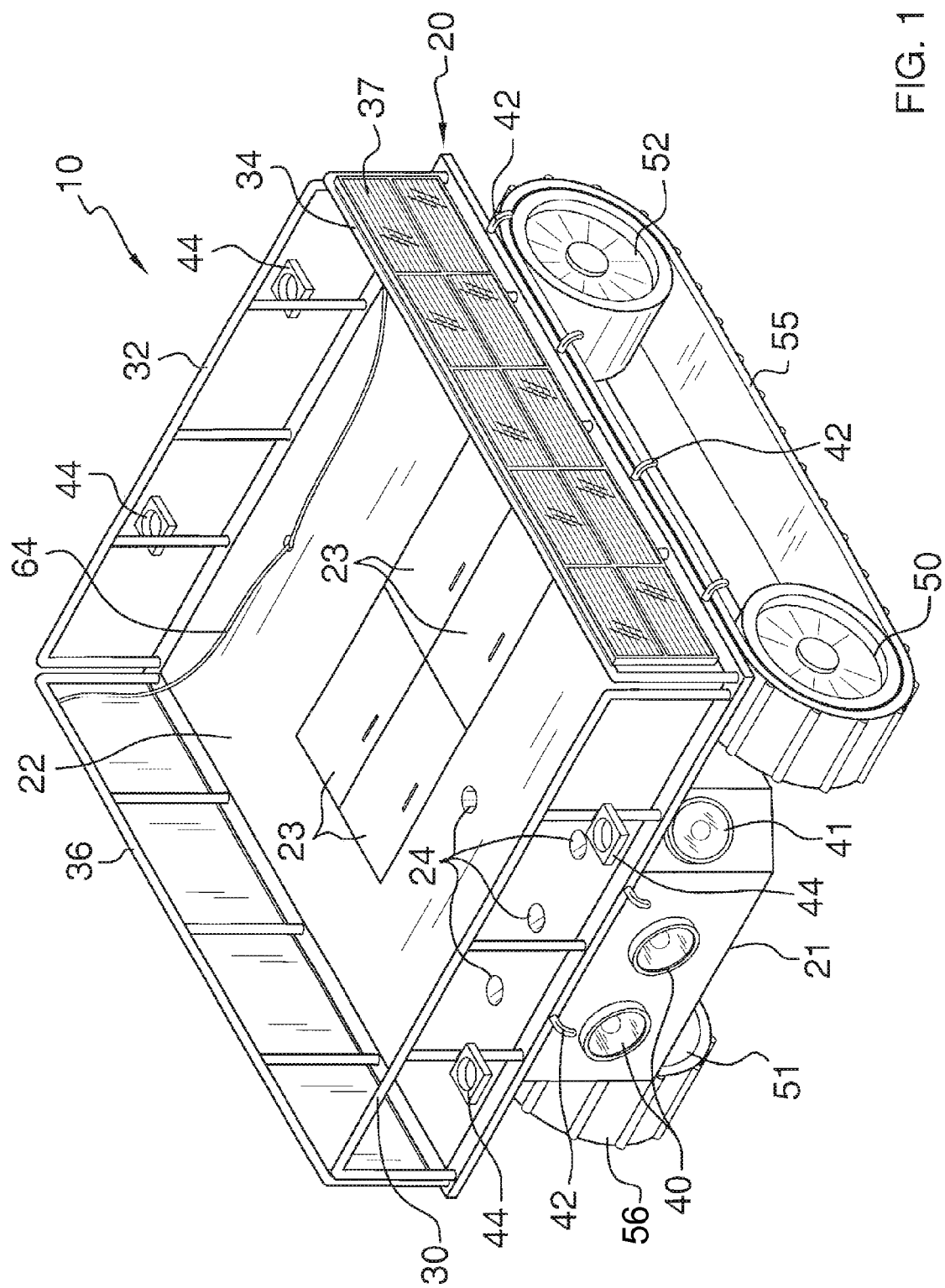
FIG. 1 is a frontal perspective view.

Referring to FIG. 1, the apparatus 10 partially comprises the cart 20 having a body 21 topped by a floor 22. The plurality of storage compartments 23 is disposed substantially centrally in the floor 22 and the body 21. The plurality of spaced apart tubular holders 24 is disposed within the floor 22. At least three tubular holders 24 are importantly disposed forwardly thereby enabling holders 24 for fishing poles, especially for low light fishing conditions. The removable front rail 30 is disposed forwardly and upwardly on the floor 22. The removable rear rail 32 is disposed rearwardly and upwardly on the floor 22. The pair of spaced apart removable side rails is disposed outwardly and upwardly on the floor 22. The side rails comprise the first side rail 34 and the second side rail 36.

Figure 2:
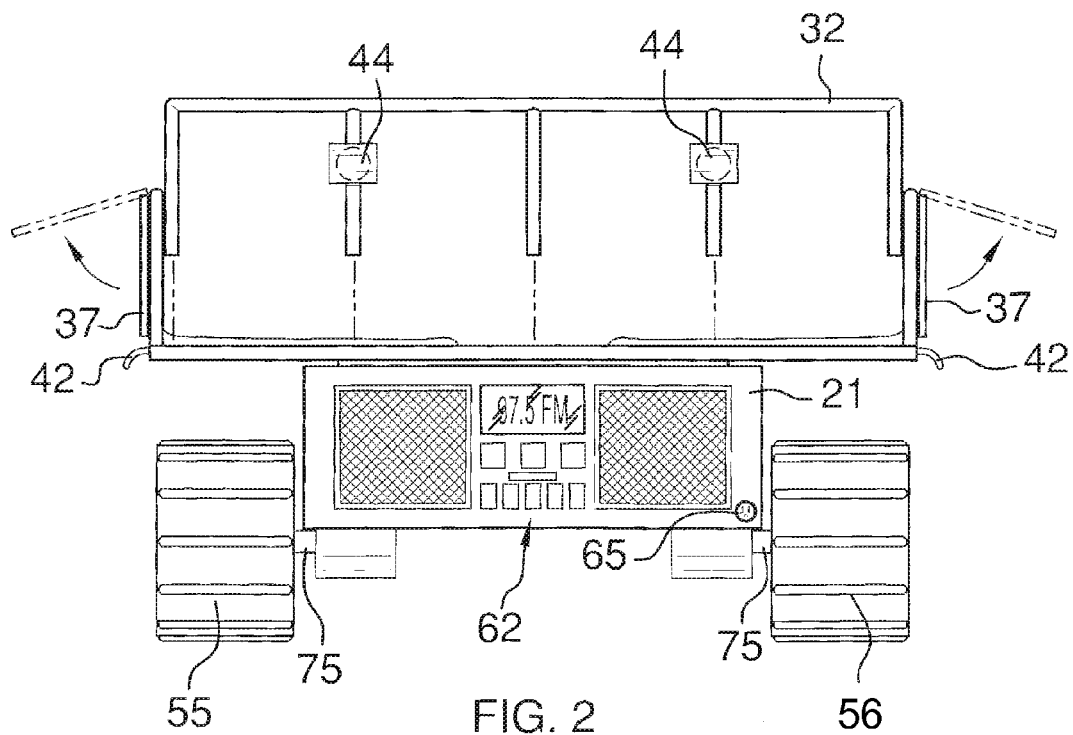
FIG. 2 is a rear elevation view.

Referring to FIG. 2, a flip up solar panel 37 is disposed outwardly on each side rail. Removability of the side rails is important not only for convenience but in providing a user to optimally position the flip up solar panels 37 for best power generation.

Figure 3:
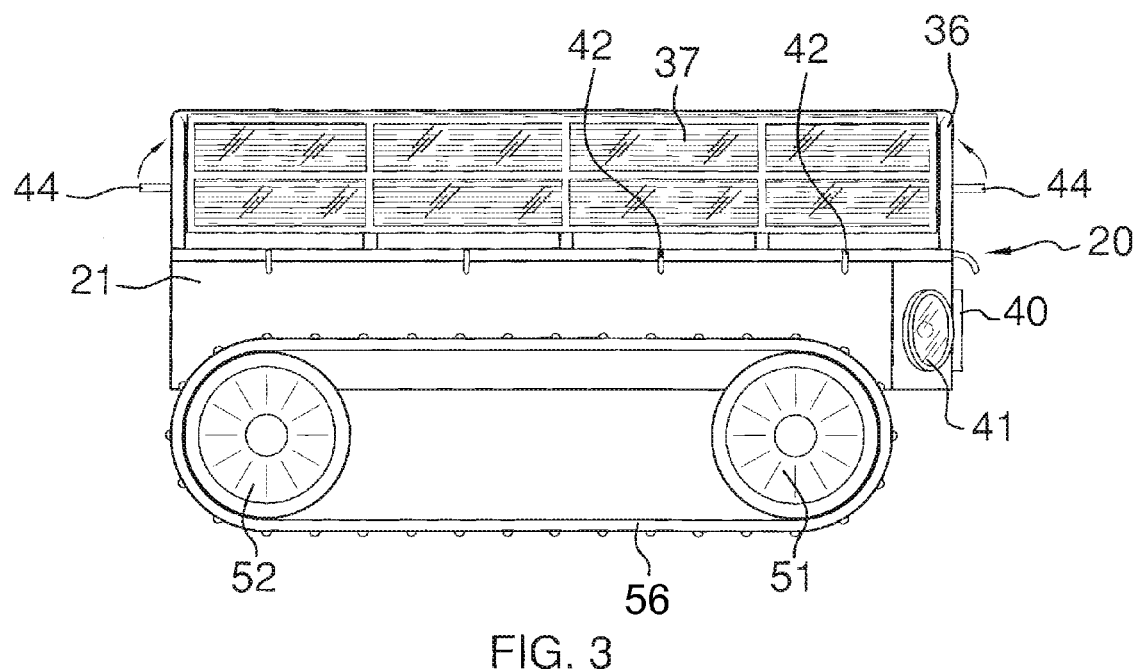
FIG. 3 is a side elevation view.
Figure 4:
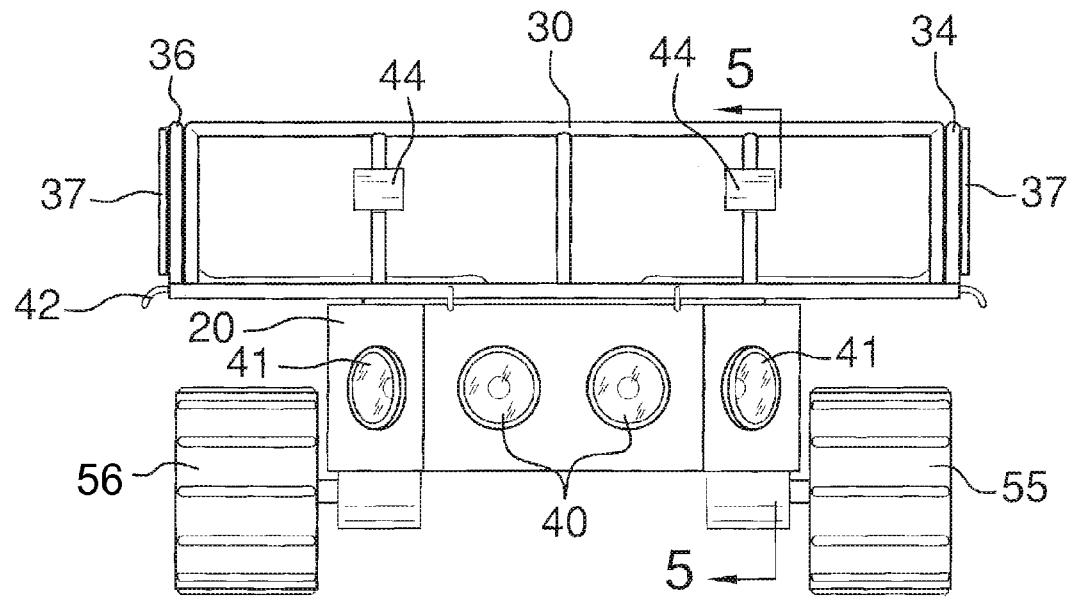
FIG. 4 is a frontal elevation view.
Figure 5:
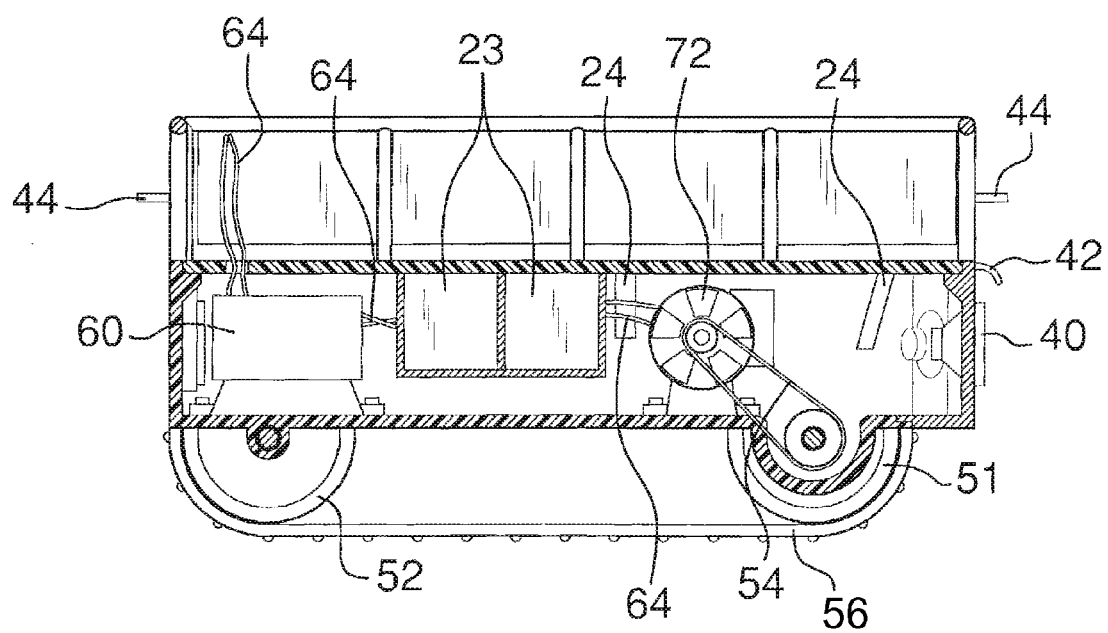
FIG. 5 is a side cross sectional view of FIG. 4, taken along the line 5-5.

Referring again to FIG. 1 and to FIG. 3, the plurality of spaced apart utility hooks 42 is disposed outwardly on the floor 22. The plurality of spaced apart flip down cup holders 44 is disposed outwardly on the front rail 30 and the rear rail 32.

Referring to FIG. 4 and again to FIG. 1, the pair of forward lights 40 is disposed forwardly on the body 21. The pair of spaced apart angled lights 41 is disposed partially forwardly and partially laterally on the body 21. The multi-direction lights provide excellent, widespread coverage ahead of and to the sides of the apparatus 10 that, importantly, would not otherwise be provided.

Again viewing FIGS. 1 and 3, a pair of spaced apart free wheels 52 is disposed rearwardly, downwardly and outwardly on the body 21. The pair of spaced apart drive wheels is disposed forwardly, outwardly, and downwardly on the body 21. The drive wheels comprise the first drive wheel 50 and the second drive wheel 51. A horizontal axle 75 is connected inwardly to each drive wheel. A carrier bearing 74 is disposed inwardly on each axle 75. The carrier bearings 74 are supported downwardly from the body 21.

Figure 6:
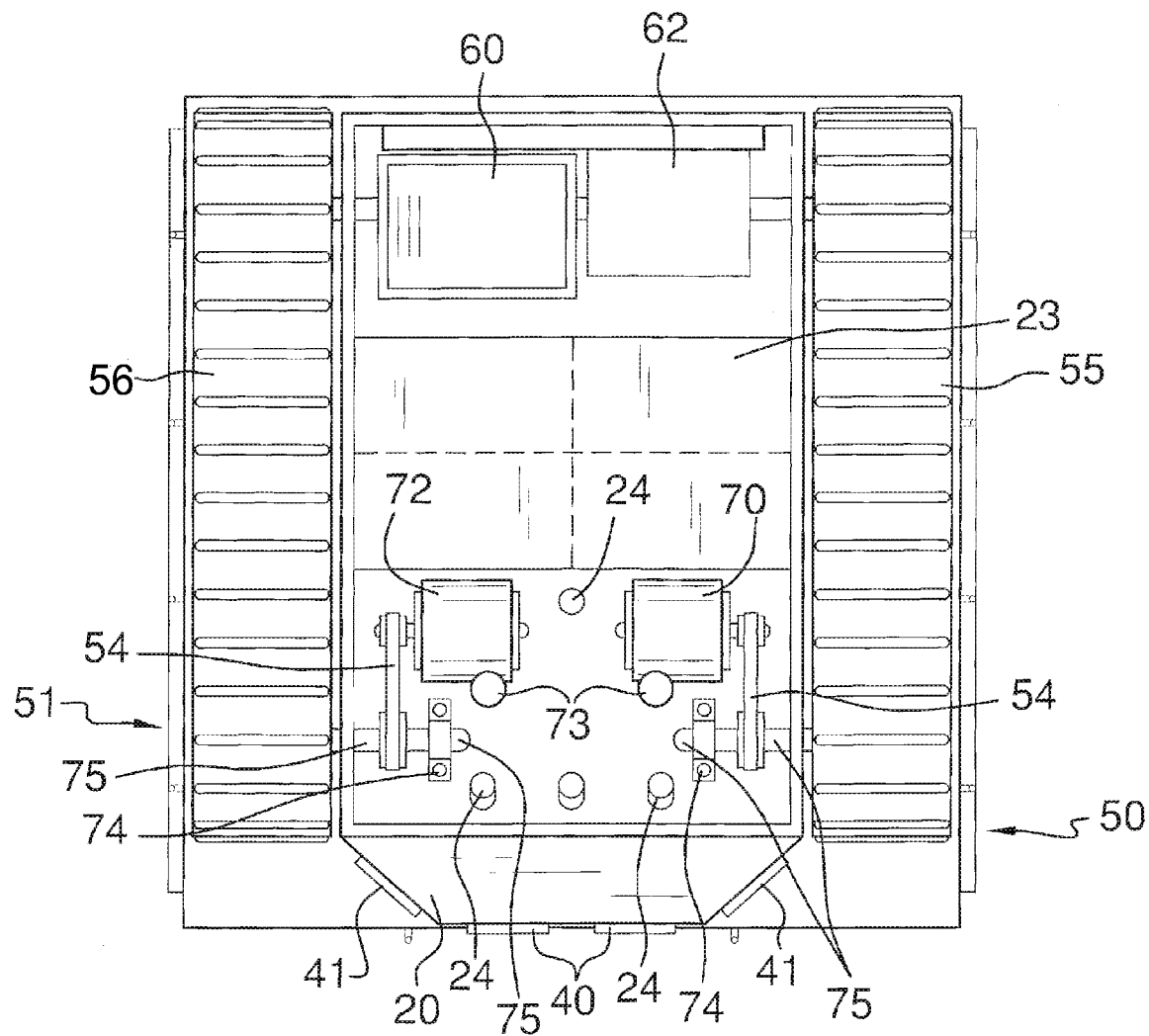
FIG. 6 is a bottom plan view.

Referring to FIG. 6, the pair of spaced apart motors is disposed downwardly and substantially rearwardly on the body 21. The first motor 70 drives the first drive wheel 50 via one of the axles 75 and a drive belt 54. The second motor 72 drives the second drive wheel 51 via one of the axles 75 and a drive belt 54. An identical actuator 73 is in communication with each motor. The actuators are individually controlled by a remote control (not shown). Various capable remote controls are well known in the art. A continuous treaded right track 55 connects the first drive wheel 50 to one of the free wheels 52. A continuous treaded let track 56 connects the second drive wheel 51 to one of the free wheels 52. Turning of the cart 20 is accomplished by requesting more power to one drive wheel versus the other, in a form of turning sometimes referred to as skid steering. Sharpest turns are thereby accomplished by cutting all power to one drive wheel while propelling the opposite. Straight progress requires equal power applied to each drive wheel.

Referring to FIG. 2, the radio 62 is mounted within the body 21 and facing rearwardly. The charging port 65 is also disposed on the body 21 rearwardly. The battery pack 60 is disposed downwardly from the body 21. The battery pack 60 is in communication with the charging port 65, the first motor 70, the second motor 72, the radio 62, the lights, and the solar panels 37 via electrical connections 64.

With respect to the above description then, it is to be realized that the optimum dimensional relationships for the parts of the remote controlled utility vehicle, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the remote controlled utility vehicle.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the remote controlled utility vehicle may be used.

Therefore, the foregoing is considered as illustrative only of the principles of the remote controlled utility vehicle. Further, since numerous modifications and changes will readily occur to those skilled in the art, it is not desired to limit the remote controlled utility vehicle to the exact construction and operation shown and described, and accordingly, all suitable modifications and equivalents may be resorted to, falling within the scope of the remote controlled utility vehicle.

What is claimed is:

1. A remote controlled utility cart comprising, in combination:

a cart having a body topped by a floor;

a plurality of storage compartments disposed substantially centrally in the floor and the body;

a plurality of spaced apart tubular holders disposed within the floor;

a front rail disposed forwardly and upwardly on the floor;

a rear rail disposed rearwardly and upwardly on the floor;

a pair of spaced apart side rails disposed outwardly and upwardly on the floor, the side rails comprising a first side rail and a second side rail;

a plurality of spaced apart utility hooks disposed outwardly on the floor;

a plurality of spaced apart flip down cup holders disposed outwardly on the front rail and the rear rail;

a pair of forward lights disposed forwardly on the body;

a pair of spaced apart angled lights disposed partially forwardly and partially laterally on the body;

a pair of spaced apart free wheels disposed rearwardly, downwardly and outwardly on the body;

a pair of spaced apart drive wheels disposed forwardly, outwardly, and downwardly on the body, the drive wheels comprising a first drive wheel and a second drive wheel;

an identical horizontal axle connected inwardly to each drive wheel;

a carrier bearing disposed inwardly on each axle, the carrier bearings supported downwardly from the body;

a pair of spaced apart motors disposed downwardly and substantially forwardly on the body, a first motor driving the first drive wheel via one of the axles, a second motor driving the second drive wheel via one of the axles;

an identical actuator in communication with each motor, each actuator individually controlled by a remote control;

a continuous treaded right track connecting the first drive wheel to one of the free wheels;

a continuous treaded left track connecting the second drive wheel to one of the free wheels;

a radio mounted within the body and facing rearwardly;

a charging port disposed on the body;

a battery pack disposed downwardly from the body, the battery pack in communication with the charging port, the motors, the radio, and the lights.

2. A remote controlled utility cart comprising, in combination:

a cart having a body topped by a floor;

a plurality of storage compartments disposed substantially centrally in the floor and the body;

a plurality of spaced apart tubular holders disposed within the floor;

a front rail disposed forwardly and upwardly on the floor;

a rear rail disposed rearwardly and upwardly on the floor;

a pair of spaced apart side rails disposed outwardly and upwardly on the floor, the side rails comprising a first side rail and a second side rail;

a flip up solar panel disposed outwardly on each side rail;

a plurality of spaced apart utility hooks disposed outwardly on the floor;

a plurality of spaced apart flip down cup holders disposed outwardly on the front rail and the rear rail;

a pair of forward lights disposed forwardly on the body;

a pair of spaced apart angled lights disposed partially forwardly and partially laterally on the body;

a pair of spaced apart free wheels disposed rearwardly, downwardly and outwardly on the body;

a pair of spaced apart drive wheels disposed forwardly, outwardly, and downwardly on the body, the drive wheels comprising a first drive wheel and a second drive wheel;

an identical horizontal axle connected inwardly to each drive wheel;

a carrier bearing disposed inwardly on each axle, the carrier bearings supported downwardly from the body;

a pair of spaced apart motors disposed downwardly and substantially forwardly on the body, a first motor driving the first drive wheel via one of the axles, a second motor driving the second drive wheel via one of the axles;

an identical actuator in communication with each motor, each actuator individually controlled by a remote control;

a continuous treaded right track connecting the first drive wheel to one of the free wheels;

a continuous treaded left track connecting the second drive wheel to one of the free wheels;

a radio mounted within the body and facing rearwardly;

a charging port disposed on the body;

a battery pack disposed downwardly from the body, the battery pack in communication with the charging port, the motors, the radio, the lights, and the solar panels.

3. A remote controlled utility cart comprising, in combination:

a cart having a body topped by a floor;

a plurality of storage compartments disposed substantially centrally in the floor and the body;

a plurality of spaced apart tubular holders disposed within the floor;

a removable front rail disposed forwardly and upwardly on the floor;

a removable rear rail disposed rearwardly and upwardly on the floor;

a pair of spaced apart removable side rails disposed outwardly and upwardly on the floor, the side rails comprising a first side rail and a second side rail;

a flip up solar panel disposed outwardly on each side rail;

a plurality of spaced apart utility hooks disposed outwardly on the floor;

a plurality of spaced apart flip down cup holders disposed outwardly on the front rail and the rear rail;

a pair of forward lights disposed forwardly on the body;

a pair of spaced apart angled lights disposed partially forwardly and partially laterally on the body;

a pair of spaced apart free wheels disposed rearwardly, downwardly and outwardly on the body;

a pair of spaced apart drive wheels disposed forwardly, outwardly, and downwardly on the body, the drive wheels comprising a first drive wheel and a second drive wheel;

a horizontal axle connected inwardly to each drive wheel;

a carrier bearing disposed inwardly on each axle, the carrier bearings supported downwardly from the body;

a pair of spaced apart motors disposed downwardly and substantially forwardly on the body, a first motor driving the first drive wheel via one of the axles, a second motor driving the second drive wheel via one of the axles;

an identical actuator in communication with each motor, each actuator individually controlled by a remote control;

a continuous treaded right track connecting the first drive wheel to one of the free wheels;

a continuous treaded left track connecting the second drive wheel to one of the free wheels;

a radio mounted within the body and facing rearwardly;

a charging port disposed on the body;

a battery pack disposed downwardly from the body, the battery pack in communication with the charging port, the motors, the radio, the lights, and the solar panels.

* * * * *